Patented June 28, 1949

2,474,736

UNITED STATES PATENT OFFICE 2,474,736

MONOAZO DYESTUFFS

Basil Jason Heywood, Blackley, Manchester, England, assignor to Imperial Chemical Industries Limited, a corporation of Great Britain No Drawing. Application August 3, 1945, Serial No. 608,842. In Great Britain August 28, 1944

4 Claims. (Cl. 260—205)

This invention relates to new monoazo dyestuffs; more particularly to new monoazo dyestuffs suitable for dyeing synthetic fibres such as cellulose acetate artificial silk and nylon.

According to the present invention new monoazo dyestuffs are made by a process comprising coupling a diazotised p-nitroaniline which may carry substituents other than sulphonic acid, carboxylic acid or cyano groups, with the sulphuric ester of an N-hydroxyalkyl-N-phenyl- or naphthyl-alkyl (2, 3 or 4 carbon atoms) - aniline which may carry further substituents other than sulphonic acid or carboxyl substituents subject to its being capable of coupling in the para-position to the nitrogen atom.

According to a further feature of this invention the same monoazo dyestuffs are made by using as coupling component the N-hydroxyalkyl-N-phenyl or naphthyl-alkyl (2, 3 or 4 carbon atoms) - aniline in place of its sulphuric ester and subsequently converting the resulting hydroxyalkyl-monoazo compound to its sulphuric ester by treatment with sulphuric acid or other known agent suited to yield its sulphuric ester.

Examples of nitroarylamines are:

p-nitraniline
2-chloro-4-nitraniline
2-bromo-4-nitroaniline
2:5-dichlor-4-nitraniline
2:6-dichlor-4-nitraniline
2:6-dibrom-4-nitraniline
2-brom-6-chlor-4-nitraniline
6-chlor-2:4-dinitraniline
6-bromo-2:4-dinitroaniline
2:4-dinitraniline
5-nitro-2-aminoanisole
5-nitro-2-aminotoluene By way of an N-hydroxyalkyl-N-aryl-alkyl (2, 3 or 4 carbon atoms)-aniline there may be employed, e. g:

N-$\beta$-hydroxyethyl-N-$\beta'$-phenylethylaniline
N - $\beta$ - hydroxyethyl - N - $\beta$ - phenylethyl - m-aminotoluene
N - $\beta$ - hydroxyethyl - N - $\beta$ - phenylethyl - 2-methoxy-5-methylaniline
N-$\beta$-hydroxyethyl-N-$\beta'$-phenylethyl-m-aminoanisole
N - $\beta$ - hydroxyethyl - N - $\beta'$ - phenylethyl - m-acetylaminoaniline
N-$\beta$-hydroxyethyl-N-$\beta'$-phenylethyl-m-chloraniline
N-$\beta$-hydroxyethyl-N-$\gamma'$-phenylpropyl-aniline N-$\beta$-phenylethyl-N-$\beta$-hydroxy-n-propyl-aniline
N-$\beta$-phenylethyl-N-$\epsilon'$-hydroxy-n-amyl-aniline
N-$\beta$-hydroxyethyl-N-$\alpha'$-phenylethylaniline
N-$\beta$-hydroxyethyl-N-$\beta'$-naphthyl-(2)-ethylaniline
N-$\beta$-hydroxyethyl-N-$\beta'$-p-tolylethylaniline The new dyestuffs, in the form of their alkali metal or ammonium salts, are soluble in water, and have very good affinity for cellulose acetate artificial silk which they dye from a neutral, slightly acid, or slightly alkaline dyebath affording violet, brown, orange, crimson and red shades. These shades are of good fastness, are dischargeable and are suitable for printing cellulose acetate artificial silk. The new dyestuffs are, moreover, generally suitable for application to acetate artificial silk from dilute or 'long liquors' such as are employed in dyeing with the winch machine.

The new dyestuffs are also valuable for the dyeing of wool, natural silk, tin weighted silk, leather and linear superpolyamide fibres such as nylon.

The application of the new dyestuffs to the colouring of synthetic fibres, for example cellulose acetate artificial silk and linear superpolyamides such as nylon, constitutes a still further feature of the invention.

The invention is illustrated, but not limited, by the following examples in which the parts are by weight.

*Example 1*

A fine suspension of 13.8 parts of p-nitroaniline in 400 parts of water and 36 parts of 36% hydrochloric acid is diazotised by the addition of 6.9 parts of sodium nitrite dissolved in 50 parts of water. The filtered solution of the diazo compound, cooled to 5° C., is slowly added to a similarly cooled and stirred solution of 34.3 parts of the sodium salt of N-$\beta$-hydroxyethyl-N-$\beta'$-phenylethylaniline sulphuric ester in 400 parts of water. After stirring the mixture for one hour one completes the coupling by adding sufficient 50% aqueous sodium acetate to remove the mineral acidity of the suspension. The suspension of the monoazo dyestuff is then rendered just alkaline to Brilliant Yellow by the addition of 5 N sodium hydroxide solution. The dyestuff is filtered off, washed with 2½% aqueous sodium chloride solution and dried at 30–40° C.

The new dyestuff forms a dark red powder which dissolves in water with a scarlet colour and in concentrated sulphuric acid with a dull red colour. It dyes cellulose acetate artificial silk in scarlet shades when applied from a neutral dyebath containing Glauber's salt or sodium chloride, the dyeings exhibiting good fastness to wet treatments and light, good dischargeability and freedom from subliming. It is also suitable for the printing of acetate artificial silk. The new dyestuff is represented by the following formula:

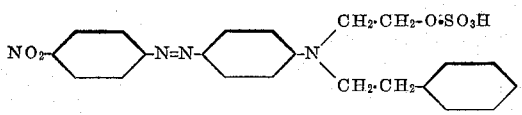

N - β - hydroxyethyl - N - β' - phenylethylaniline sulphuric ester is obtainable by causing N-β-phenylethylaniline to react with ethylene chlorohydrin in boiling aqueous suspension in the presence of chalk to give N-β-hydroxyethyl-N-β'-phenylethylaniline (boiling point 223–30°/14 min.) which is converted to its sulphuric ester by treatment with chlorosulphonic acid in tetrachloroethane. N-β-phenylethylaniline is obtained by heating aniline with β-phenylethyl bromide.

*Example 2*

13.8 parts of p-nitroaniline are diazotised as in Example 1. The solution of the diazo compound, cooled to 5°–10° C., is then gradually added with stirring to a similarly cooled solution of 35.7 parts of the sodium salt of N-β-hydroxyethyl-N-γ'-phenylpropylaniline sulphuric ester in 400 parts of water. After stirring the mixture for 2 hours, sufficient 50% aqueous sodium acetate is added to remove the mineral acidity of the coupling medium. Stirring is continued until coupling is complete. The suspension of the monoazo dyestuff is then rendered just alkaline to Brilliant Yellow by the addition of 5 N aqueous sodium hydroxide. The dyestuff is filtered off, washed with 2½% aqueous sodium chloride and dried at 30°–40° C.

The new dyestuff forms a dark red powder which dissolves in water with a red colour and in sulphuric acid with a reddish brown colour. It dyes cellulose acetate artificial silk in scarlet shades when applied from a neutral dyebath containing Glauber's salt or sodium chloride, the dyeings exhibiting good fastness to wet treatments and to light, good dischargeability and freedom from sublimation. The new dyestuff is represented by the following formula:

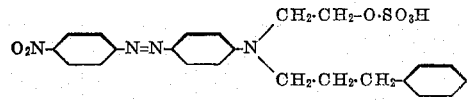

N-β-hydroxyethyl N - γ' - phenylpropylaniline sulphuric ester is obtainable by causing N-γ-phenylpropylaniline to react with ethylene chlorohydrin in boiling aqueous suspension in the presence of chalk to give N-β-hydroxyethyl-N-γ' - phenylpropylaniline (boiling point 237–40° C./14 mins.) which is converted into its sulphuric ester by treatment with chlorosulphonic acid in tetrachloroethane. N-γ-phenyl-propylaniline is obtained by heating aniline with γ - phenyl - n - propylbromide.

*Example 3*

A fine suspension of 17.3 parts of o-chloro-p-nitroaniline in 300 parts of water and 30 parts of 36% hydrochloric acid is diazotised by the addition of 6.9 parts of sodium nitrite dissolved in 50 parts of water. The filtered solution of the diazo compound, cooled to 5° C., is slowly added to a similarly stirred and cooled solution of 34.3 parts of the sodium salt of N-β-hydroxy-ethyl-N-β' phenylethylaniline sulphuric ester dissolved in 400 parts of water. After stirring for one hour sufficient 50% aqueous sodium acetate is added to remove the mineral acidity of the coupling medium. The suspension is stirred until the coupling is complete. The suspension of the monoazo dyestuff is then made slightly alkaline to Brilliant Yellow by the addition of 5 N aqueous sodium hydroxide. The dyestuff is filtered off, washed with 2½% aqueous sodium chloride solution and dried at 30°–40° C.

The new dyestuff forms a dark greenish powder which dissolves in water with a red colour and in concentrated sulphuric acid with a brown colour. It dyes cellulose acetate artificial silk and nylon in crimson shades when applied from a neutral dyebath containing Glauber's salt or sodium chloride, the dyeings exhibiting good fastness to wet treatments and to light, good dischargeability and freedom from sublimation.

*Example 4*

In Example 3 35.7 parts of the sodium salt of N-β-hydroxyethyl-N-γ'-phenylpropylaniline sulphuric ester are used in place of the 343 parts of the sodium salt of N - β - hydroxyethyl-N - β'-phenylethylaniline sulphuric ester.

The new dyestuff forms a dark greenish powder which dissolves in hot water to a red solution and in concentrated sulphuric acid to a reddish brown solution. It dyes cellulose acetate artificial silk from a neutral or slightly alkaline dyebath containing Glauber's salt or sodium chloride in red shades, the dyeings having good fastness to wet treatments and to light. It is also well suited for printing cellulose acetate artificial silk.

*Example 5*

13.8 parts of p-nitroaniline are diazotised as in Example 1. The solution of the diazo compound, cooled to 5–10° C. is then gradually added to a cooled and stirred solution of 35.7 parts of the sodium salt of N-β-hydroxyethyl-N-β'-phenylethyl-m-aminotoluene sulphuric ester in 400 parts of water containing sufficient sodium carbonate to keep the mixture alkaline to Brilliant Yellow. The suspension of the monoazo dyestuff so obtained is stirred for two hours. The dyestuff is then filtered off, washed with 2.5% aqueous sodium chloride and dried at 30–40° C.

The new dyestuff is a dark red powder which dissolves in water to give a red solution and in sulphuric acid to give a dull yellow solution. It dyes cellulose acetate artificial silk in crimson shades when applied from a neutral dyebath containing Glauber's salt or sodium chloride, and the dyeings exhibit good fastness to wet treatment and to light, good dischargeability and freedom from sublimation.

N-β-hydroxyethyl - N-β'-phenylethyl-m-amino toluene sulphuric ester is obtainable by causing N-β-hydroxyethyl-m-toluidine to react with β-phenylethyl bromide in boiling aqueous suspension in the presence of chalk to give N-β-hydroxyethyl-N-β'-phenylethyl-m-aminotoluene (boiling point 216–220° C./20 min.) which is then converted into its sulphuric ester by treatment with chlorosulphonic acid in ethylene dichloride solution. The new dyestuff is represented by the following formula:

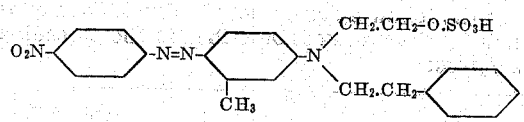

Example 6

In the process described in Example 5, 38.75 parts of the sodium salt of N-β-hydroxyethyl-N-β'-phenylethyl-m-chloroaniline sulphuric ester are used in the place of the 35.7 parts of the sodium salt of N-β-hydroxyethyl-N-β'-phenylethyl-m-aminotoluene sulphuric ester.

The new dyestuff is a red powder which dissolves in hot water to give a red solution and in concentrated sulphuric acid to give an orange brown solution. It dyes cellulose acetate artificial silk and nylon from a neutral or slightly alkaline dyebath containing Glauber's salt or sodium chloride in scarlet shades, the dyeings having good fastness to wet treatments and to light. It is also well suited for printing cellulose acetate artificial silk. The new dyestuff is represented by the following formula:

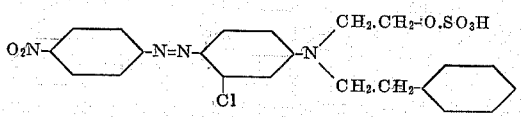

N-β-hydroxyethyl-N-β'-phenylethyl-m-chloroaniline sulphuric ester may be attained by causing N-β-hydroxyethyl-m-chloroaniline to react with β-phenylethyl bromide in boiling aqueous suspension in the presence of chalk to give N-β-hydroxyethyl-N-β-phenylethyl-m-chloroaniline (B. P. 180–97° C./0.1 min.) which is converted into its sulphuric ester by treatment with chlorosulphonic acid in ethylene dichloride solution.

Example 7

In the process described in Example 5, 37.3 parts of the sodium salt of N-β-hydroxyethyl-N-β'-phenylethyl-m-amino anisole sulphuric ester are used in the place of the 35.7 parts of the sodium salt of N-β-hydroxyethyl-N-β'-phenylethyl-m-aminotoluene sulphuric ester.

The new dyestuff is a black powder which dissolves in hot water to give a crimson solution and in concentrated sulphuric acid to give a reddish brown colouration. It dyes cellulose acetate artificial silk and nylon in crimson shades when applied from a neutral dyebath containing Glauber's salt or sodium chloride, the dyeings exhibiting good fastness to wet treatments and to light, good dischargeability and freedom from sublimation. It is also well suited for printing cellulose acetate artificial silk. The new dyestuff is represented by the following formula:

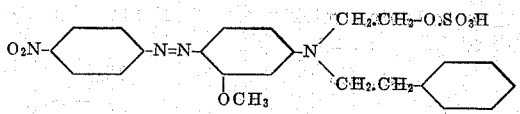

N-β-hydroxyethyl-N-β'-phenylethyl-m-amino-anisole sulphuric ester may be obtained by causing N-β-hydroxyethyl-m-aminoanisole to react with β-phenylethyl bromide in boiling aqueous suspension in the presence of chalk to give N-β-hydroxyethyl-N-β'-phenylethyl-m-aminoanisole (boiling point 210° C./1.5 min.) which is converted into its sulphuric acid ester by treatment with chlorosulphonic acid in ethylene dichloride solution.

Example 8

20.7 parts of 2:6-dichloro-4-nitroaniline are diazotised by gradual addition to a solution of 6.9 parts of dry sodium nitrite in 148 parts of concentrated sulphuric acid. The sulphuric acid solution is stirred for 1–2 hours and is then added to 400 parts of ice and 100 parts of water. The filtered solution of the diazo compound so obtained is added gradually to an ice cold solution of 34.3 parts of the sodium salt of N-β-hydroxyethyl-N-β'-phenylethyl-aniline sulphuric ester in 400 parts of water. Simultaneously with the addition of the diazo solution 40% aqueous sodium hydroxide is added at such a rate as to keep the coupling mixture faintly acid to Congo red paper. The temperature of the coupling mixture is kept throughout the coupling at 0–5° C. by the addition as necessary of ice. When all the diazo solution has been added the mixture is made alkaline to litmus by the addition of aqueous sodium hydroxide. The dyestuff is then filtered off and dried.

The new dyestuff is a dark brown powder which dissolves in hot water to give an orange brown solution and in sulphuric acid to give a dull brown solution.

It dyes cellulose acetate artificial silk and nylon in orange brown shades when applied from a neutral dyebath containing Glauber's salt or sodium chloride; the dyeings exhibit good fastness to wet treatments and to light, good dischargeability and freedom from sublimation. The new dyestuff is well suited to the dyeing of cellulose acetate artificial silk from dilute or long liquor dyebaths such as are employed in dyeing with the winch.

Example 9

19 parts of 2:4-dinitroaniline are diazotised by means of nitrosyl sulphonic acid in concentrated sulphonic acid solution in the known way and the aqueous solution of the diazo compound obtained by pouring the sulphuric acid solution on to ice, is added to a solution of 34.5 parts of the sodium salt of N-β-hydroxyethyl-N-β'-phenylethyl-aniline sulphuric ester in 400 parts of water. Simultaneously with the addition of the diazo solution, 40% aqueous sodium hydroxide solution is added at such a rate as to keep the coupling mixture faintly acid to Congo red paper. The temperature of the coupling mixture is kept at 0–5° C. throughout the coupling by the addition as necessary of ice. When all the diazo solution has been added the mixture is made alkaline to litmus by the addition of sodium hydroxide solution. The suspension is stirred for several hours and the dyestuff is then filtered off, washed and dried.

The new dyestuff is a dark brown powder which dissolves in hot water to give a violet solution and in sulphuric acid to give a violet solution. It dyes cellulose acetate artificial silk in reddish violet shades when applied from a neutral dyebath containing Glauber's salt or sodium chloride, and the dyeings exhibit good fastness to wet treatments and to light.

Example 10

21.75 parts of 6-chloro-2:4-dinitroaniline are gradually added to a solution of 6.9 parts of sodium nitrite in 150 parts of sulphuric acid. The resulting solution is warmed to 50–55° C. and kept at that temperature for two hours. It is then cooled to 20–25° C. and added slowly to a stirred and cooled solution of 35.7 parts of the sodium salt of N-β-hydroxyethyl-N-β-phenylethyl - m - aminotoluene sulphuric ester in 400 parts of water. Simultaneously with the addition of the diazo solution, 40% aqueous sodium hydroxide is added at such a rate as to keep the coupling mixture faintly acid to Congo red paper. The temperature of the coupling mixture is maintained at 0–5° C. by the addition as necessary of ice. When all the diazo solution has been added, sufficient aqueous sodium hydroxide is added to render the coupling mixture alkaline to litmus. The resulting suspension is stirred for 12 hours, when the new dyestuff is isolated and dried.

It is a black powder which dissolves in hot water to give a bluish violet solution and in sulphuric acid to give a reddish brown solution. It dyes cellulose acetate artificial silk in bluish violet shades when applied from a neutral dyebath containing Glauber's salt or sodium chloride and the dyeings exhibit good fastness to wet treatments and to light. The new dyestuff is represented by the following formula:

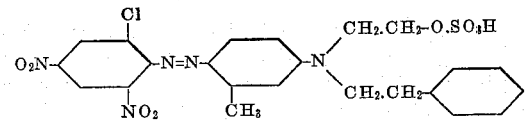

Example 11

13.8 parts of p-nitroaniline are diazotised as described in Example 1 and the diazo solution is added to a cooled and stirred solution of 24.1 parts of N-β-hydroxy-ethyl-N-β′-phenylethylaniline in 400 parts of water containing 12 parts of 36% hydrochloric acid. The mixture is stirred for one hour then sufficient 50% aqueous sodium acetate to remove the mineral acidity is added of the coupling medium. The suspension of the monoazo compound so obtained is then rendered just alkaline to Brilliant Yellow by the addition of 5 N aqueous sodium hydroxide. The monoazo compound is filtered off, washed with water and dried at 30–40° C.

The powdered water-insoluble monoazo compound obtained in the manner described above is converted into its sulphuric ester by gradual addition to 150 parts of 75–95% sulphuric acid. The resulting solution is stirred for 18 hours and then poured on to a stirred mixture of ice and water. The mixture is then stirred for one hour and the dyestuff is filtered off and washed with water. It is then re-suspended in 400 parts of water and sufficient aqueous sodium hydroxide solution is added to make the suspension alkaline to Brilliant Yellow. The sodium salt of the new dyestuff so obtained is filtered off and dried at 30–40° C.

The new dyestuff is a dark red powder which dissolves in water to give a scarlet solution and in sulphuric acid to give a dull red solution. It possesses dyeing properties similar to those of the dyestuff of Example 1 and is believed to be identical with that dyestuff.

In the following examples the dyestuffs may be made by the processes described in the preceding examples:

| Example No. | Diazo Component | Coupling Component | Shade on Cellulose acetate artificial silk |
|---|---|---|---|
| 12 | p-nitroaniline | N-β-hydroxyethyl-N-β′-p-tolylethylaniline sulphuric ester | Scarlet. |
| 13 | 2:6-dichloro-4-nitroaniline | ----do---- | Orange brown. |
| 14 | 2:6-dibromo-4-nitroaniline | ----do---- | Do. |
| 15 | p-nitroaniline | N-β-hydroxyethyl-N-β′-(1-naphthyl) ethylaniline sulphuric ester | Scarlet. |
| 16 | ----do---- | N-γ-hydroxypropyl-β′-phenylethylaniline sulphuric ester | Do. |
| 17 | ----do---- | N-n-β-hydroxypropyl-β′-phenylethylaniline sulphuric ester | Do. |
| 18 | 2-bromo-4-nitroaniline | N-β-hydroxyethyl-N-β′-phenylethylaniline sulphuric ester | Crimson. |
| 19 | 2:4-Dinitroaniline | ----do---- | Violet. |
| 20 | 2:6 dibromo-4-nitroaniline | ----do---- | Orange brown. |
| 21 | p-nitroaniline | N-β-hydroxyethyl-N-α′-phenylethylaniline sulphuric ester | Scarlet. |
| 22 | 2-chloro-4-nitroaniline | ----do---- | Crimson. |
| 23 | 2:4-dinitroaniline | ----do---- | Reddish violet. |
| 24 | 2:6-dichloro-4-nitroaniline | ----do---- | Orange brown. |
| 25 | 6-Bromo-2:4-dinitroaniline | N-β-hydroxyethyl-N-β′-phenylethyl-2-methoxy-5-methylaniline sulphuric ester. | Reddish blue. |

I claim:
1. A monoazo dyestuff represented by the formula

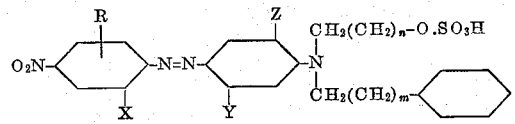

wherein R and X are selected from the group consisting of —H, —CH₃, —OCH₃, —Cl, —Br and —NO₂, Y and Z are selected from the group consisting of —H, —CH₃, —OCH₃ and —Cl, $n$ is an integer from 1 to 4, and $m$ is an integer from 1 to 3.

2. A monoazo dyestuff represented by the formula

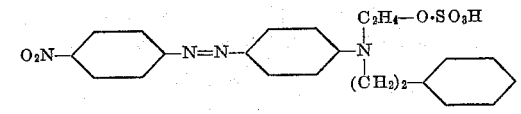

3. A monoazo dyestuff represented by the formula

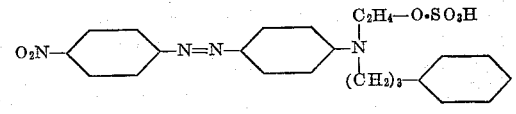

4. A monoazo dyestuff represented by the formula

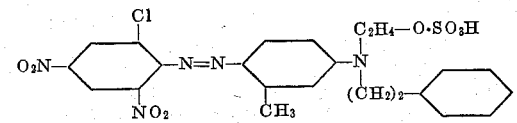

BASIL JASON HEYWOOD.

REFERENCES CITED

The following references are of record in the file of this patent:

UNITED STATES PATENTS

| Number | Name | Date |
|---|---|---|
| 1,483,084 | Green | Feb. 12, 1924 |
| 2,045,323 | Felix | June 23, 1936 |
| 2,069,836 | Knight | Feb. 9, 1937 |
| 2,088,327 | Knight | July 27, 1937 |
| 2,117,733 | Krzikalla | May 17, 1938 |

FOREIGN PATENTS

| Number | Country | Date |
|---|---|---|
| 441,884 | Great Britain | Jan. 27, 1936 |
| 833,141 | France | July 11, 1938 |